United States Patent
Kikuchi (10) Patent No.: US 6,433,738 B1
(45) Date of Patent: Aug. 13, 2002

(54) TRANSMISSION ANTENNA DIRECTIVITY CONTROL APPARATUS AND METHOD

(75) Inventor: Tohru Kikuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/981,911

(22) Filed: Oct. 19, 2001

(30) Foreign Application Priority Data

Oct. 25, 2000 (JP) ........................................ 2000-324807

(51) Int. Cl.⁷ ................................................ H01Q 3/26
(52) U.S. Cl. ........................ 342/368; 342/373; 342/154; 342/157
(58) Field of Search ................................ 342/368, 373, 342/378, 154, 157

(56) References Cited

U.S. PATENT DOCUMENTS 3,824,595 A   7/1974   Hall ........................ 343/113 R
4,720,712 A * 1/1988   Brookner et al. ............ 342/379

FOREIGN PATENT DOCUMENTS

EP   0 613 019 A1   8/1994
GB   2 344 3221      5/2000
GB   2 349 045      10/2000

OTHER PUBLICATIONS

European Search Report for corresponding European Application.

* cited by examiner

Primary Examiner—Theodore M. Blum
(74) Attorney, Agent, or Firm—Whitham, Curits & Christofferson, PC (57) ABSTRACT

In a transmission antenna directivity control apparatus, a reception multi-beam generation section executes weights and combines reception signals from reception array antenna elements using a preset weight coefficient to generate reception multi-beams. A transmission weight coefficient generation section generates, in accordance with detection powers of the reception multi-beams, a transmission weight coefficient for transmission data in correspondence with each of transmission multi-beams corresponding to transmission array antenna elements. A transmission multi-beam generation section multiplies the transmission data by the transmission weight coefficient to generate the transmission multi-beams and supplies them to the corresponding transmission array antenna elements. In the transmission weight coefficient generation section, a power ratio calculation section calculates a power ratio of a maximum power of the detection powers of the reception multi-beams to an adjacent power of the maximum power beam, which exhibits a larger power beam, and a transmission weight coefficient calculation section calculates the transmission weight coefficient on the basis of the power ratio. A transmission antenna directivity control method is also disclosed.

12 Claims, 6 Drawing Sheets

TRANSMISSION ANTENNA DIRECTIVITY CONTROL APPARATUS AND METHOD

BACKGROUND OF THE INVENTION

The present invention relates to a transmission antenna directivity control scheme for receiving a reverse link radio wave by a plurality of reception array antenna elements and controlling the directivity of a forward link transmission signal to be transmitted from each of a plurality of transmission array antenna elements in accordance with the reception signal.

The CDMA (Code Division Multiple Access) scheme can increase the subscriber capacity and is expected as a radio access scheme for a next-generation mobile communication cellular system. However, on the base station receiving side, another user signal simultaneously accessing using the same carrier causes interference, and on the mobile station receiving side, a signal transmitted to another user causes interference. To remove such interference, an array antenna is used.

In an array antenna, signals are transmitted/received by a plurality of antennas and subjected to weighting and combining using complex numbers to form directivity beams while controlling the amplitude and phase of the reception signal of each antenna, thereby suppressing interference with another user. An example of such array antenna control scheme is a multi-beam scheme.

Figure 7:
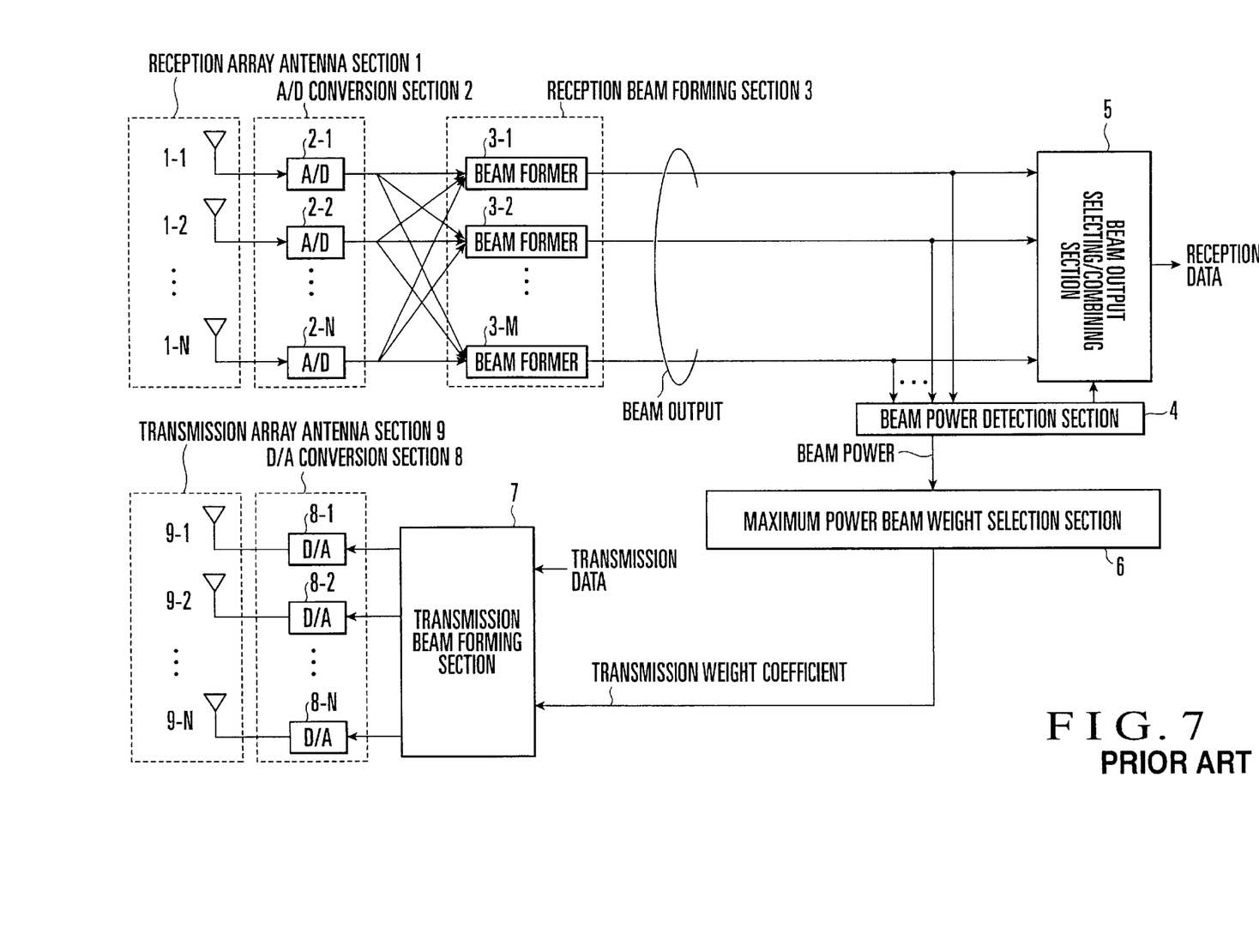
FIG. 7 is a block diagram of a conventional transmission antenna directivity control apparatus.

FIG. 7 shows a conventional transmission directivity control apparatus using a multi-beam scheme. In this multi-beam scheme, a signal is received by N (N is an integer of 2 or more) antenna elements 1-1 to 1-N laid out in proximity in a reception array antenna section 1 and converted into digital signals by A/D converters 2-1 to 2-N arranged in an A/D conversion section 2 in correspondence with the antennas.

In a reception beam forming section 3, the reception signals output from the A/D conversion section 2 are multiplied by a weight coefficient, which is calculated in advance, by multipliers using M (M is an integer of 2 or more) beam formers 3-1 to 3-M for fixed beams. Next, the signals after multiplication are combined to control the phases and amplitudes, thereby realizing reception of beams formed in specific directions.

Figure 4:
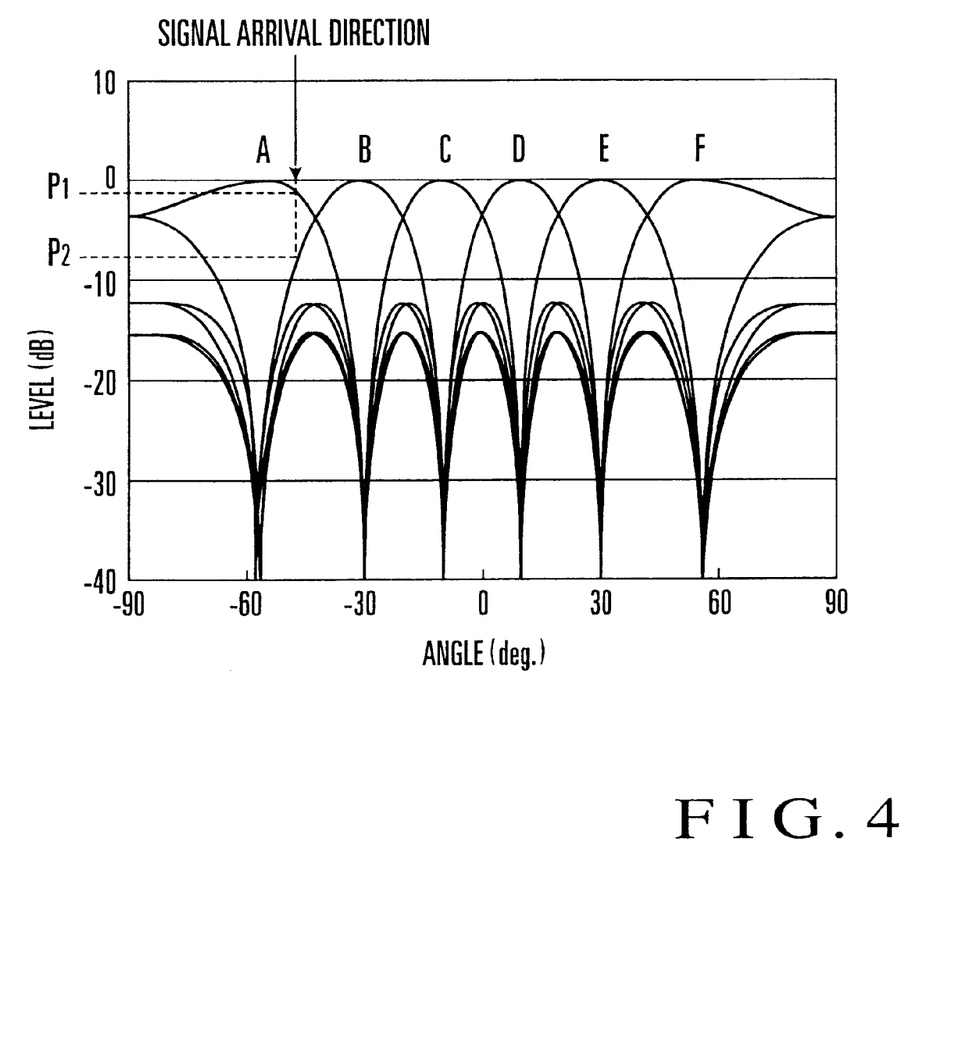
FIG. 4 is a view showing multi-beam patterns.

The M fixed beams are laid out to cover a predetermined spatial area (e.g., a sector) as uniform as possible. FIG. 4 shows, as multi-beam patterns, a case wherein a ±90° area is covered using six quadrature multi-beams A to F. The quadrature multi-beams are formed such that the peak position of each multi-beam corresponds to the null level of other corresponding beams.

On the receiving side, a beam power detection section 4 measures the power of the output from each of the beam formers 3-1 to 3-M and notifies a beam output selecting/combining section 5 of each reception power together with a beam number. The beam output selecting/combining section 5 selects and combines one or more beams that exhibits high-level reception powers from the reception powers and outputs the combined beam. When the multi-beams shown in FIG. 4 are used, the reception gain degrades by about 4 dB from the beam peak near the intersection of two adjacent beams. Hence, for the signal of the desired radio wave that arrives from the intersection direction, the reception power can be compensated by receiving the signal by two adjacent beams at the intersection and combining the outputs.

When forward link transmission is to be performed using the multi-beam scheme, using the reception powers detected by the beam power detection section 4, a beam that exhibits the maximum reception power is selected by a maximum beam weight selection section 6. A transmission beam forming section 7 transmits user data using a forward link weight coefficient corresponding to the selected beam. The signal from the transmission beam forming section 7 is converted into analog data by D/A converters 8-1 to 8-N and transmitted through transmission array antennas 9-1 to 9-N.

In executing forward link transmission using the multi-beam scheme, when the user is near the intersection of two adjacent beams, the transmission direction shifts from an optimum direction even when one of the two beams is selected and transmitted.

To solve this problem, the number of fixed beams is increased, and the resolving power in the transmission direction is raised. However, this increases the calculation amounts of the reverse link beam formers 3-1 to 3-M and maximum beam weight selection section 6.

SUMMARY OF THE INVENTION

It is an object of the present invention to provide a transmission antenna directivity control apparatus and method capable of improving the transmission direction accuracy of a transmission beam with a simple arrangement.

In order to achieve the above object, according to the present invention, there is provided a transmission antenna directivity control apparatus for controlling directivity formed by a plurality of transmission array antenna elements for a radio wave signal arrival direction to a plurality of reception array antenna elements, comprising reception multi-beam generation means for weighting and combining reception signals from the reception array antenna elements using a preset weight coefficient to generate reception multi-beams, transmission weight coefficient generation means for generating, in accordance with detection powers of the reception multi-beams from the reception multi-beam generation means, a transmission weight coefficient for transmission data in correspondence with each of transmission multi-beams corresponding to the transmission array antenna elements, and transmission multi-beam generation means for multiplying the transmission data by the transmission weight coefficient from the transmission weight coefficient generation means to generate the transmission multi-beams and supplying the transmission multi-beams to the corresponding transmission array antenna elements, the transmission weight coefficient generation means comprising power ratio calculation means for calculating a power ratio of a maximum power of the detection powers of the reception multi-beams to an adjacent power of the maximum power beam, which exhibits a larger power beam, and transmission weight coefficient calculation means for calculating the transmission weight coefficient on the basis of the power ratio from the power ratio calculation means.

DESCRIPTION OF THE PREFERRED EMBODIMENTS

The present invention will be described below in detail with reference to the accompanying drawings.

Figure 1:
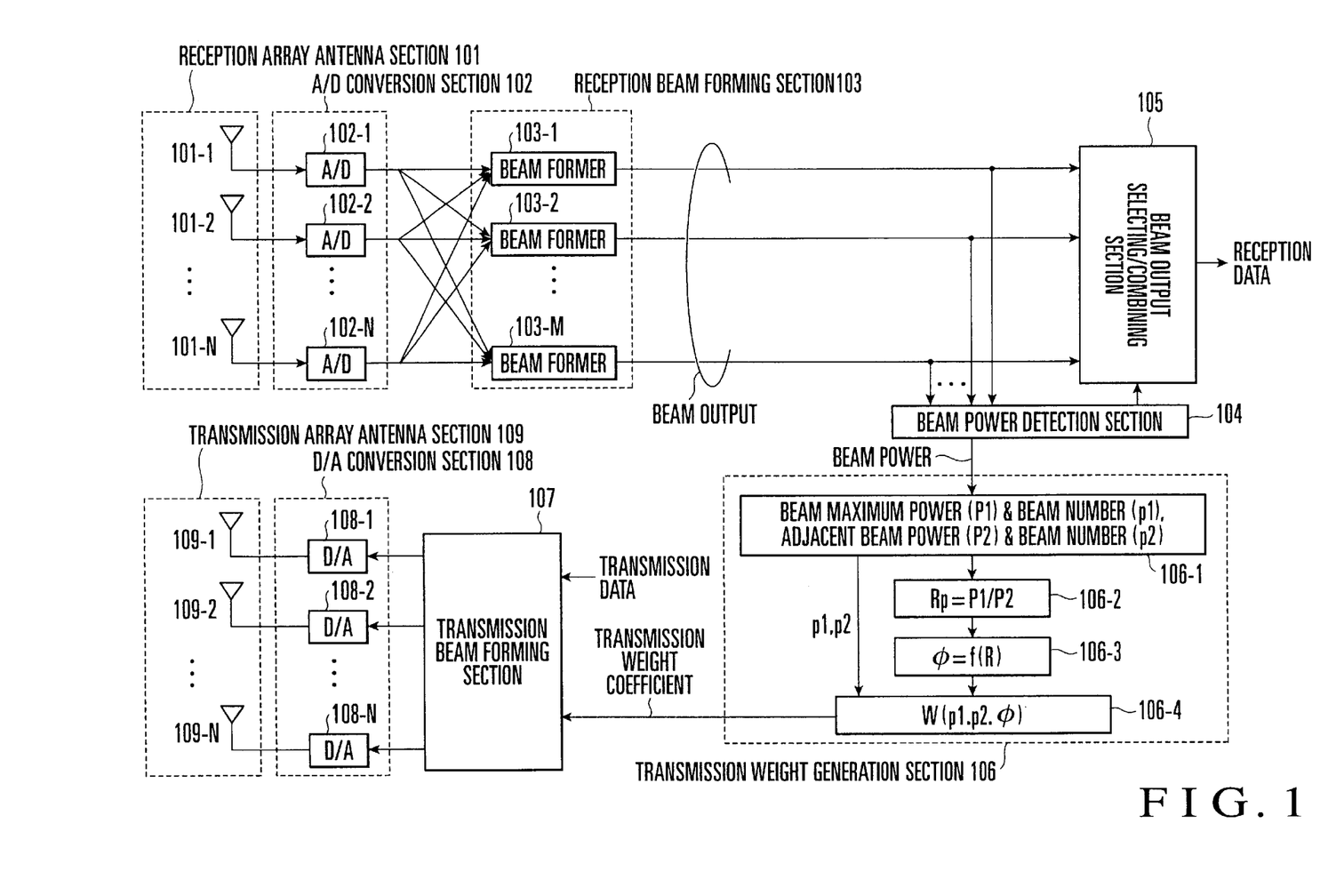
FIG. 1 is a block diagram of a transmission antenna directivity control apparatus according to the first embodiment of the present invention.

FIG. 1 shows a transmission antenna directivity control apparatus according to the first embodiment of the present invention. Referring to FIG. 1, signals received by N reception array antenna elements 101-1 to 101-N are A/D-converted by A/D converters 102-1 to 102-N arranged in correspondence with the elements. The A/D-converted signals from the A/D converters 102-1 to 102-N are output to M beam formers 103-1 to 103-M, respectively.

Figure 2:
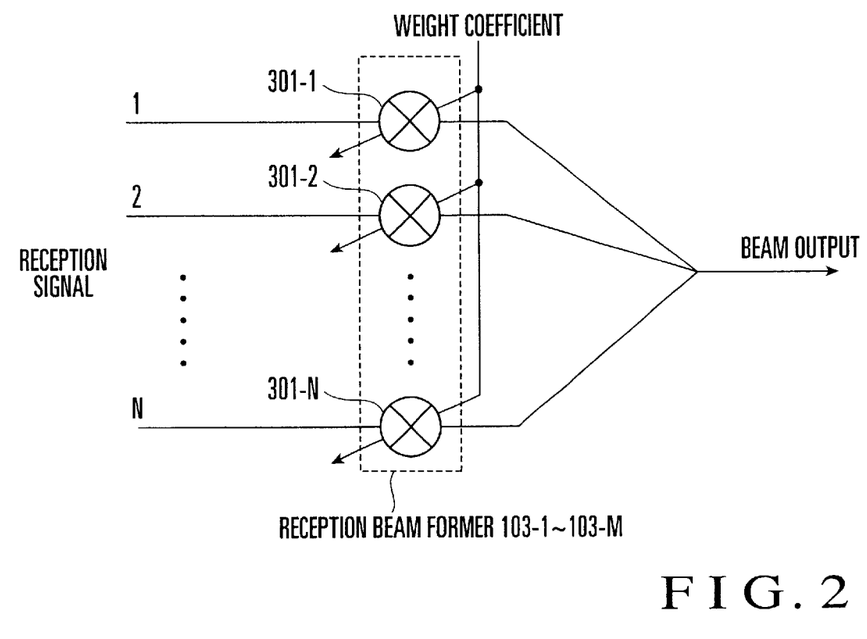
FIG. 2 is a block diagram of reception beam formers shown in FIG. 1.

The beam formers 103-1 to 103-M weight and combine the reception signals using a weight coefficient, which is calculated in advance, by multipliers 301-1 to 301-N, thereby generating M multi-beam outputs, as shown in FIG. 2. The M formed beams are output to a beam power detection section 104 and beam output selecting/combining section 105.

The beam power detection section 104 obtains the M reception signal powers of the multi-beams and outputs the results to the beam output selecting/combining section 105 and transmission weight generation section 106. The beam output selecting/combining section 105 selects and combines one or more beams of the M outputs from the beam formers 103-1 to 103-M on the basis of the reception power information from the beam power detection section 104.

In the transmission weight generation section 106, a beam number p1 and beam power P1 of a beam that exhibits the maximum power, and a beam number p2 and beam power P2 of one of adjacent beams, that exhibits a larger power, are obtained on the basis of the reception power information from the beam power detection section 104. A power ratio $R_p$ is calculated from the beam powers P1 and P2. An arrival direction shift $\phi$ is calculated from the power ratio $R_p$, and a weight coefficient is calculated from the beam numbers p1 and p2.

Figure 3:
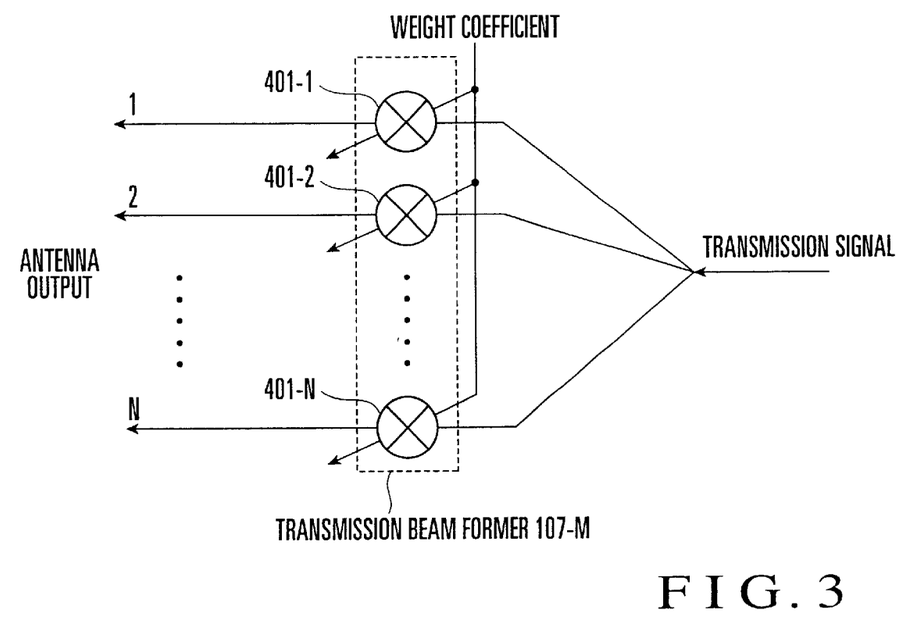
FIG. 3 is a block diagram of a transmission beam former shown in FIG. 1.

As shown in FIG. 3, in a transmission beam forming section 107, transmission signals for the respective elements are weighted using the weight coefficient by multipliers 401-1 to 401-N of a transmission beam former 107-M and then output to D/A converters 108-1 to 108-N of a D/A conversion section 108. The signals D/A-converted by the D/A converters 108-1 to 108-N are output through transmission array antennas 109-1 to 109-N as beam-formed signals.

When a reception beam direction that gives the maximum power output to a transmission beam is used, the transmission direction shift becomes large ("A" in FIG. 4). In the present invention, the amount of the transmission direction shift is detected from the power information of the reception beam, and the weight coefficient of the transmission beam is corrected on the basis of the detected shift amount. With this arrangement, the transmission direction accuracy of the transmission beam can easily be improved.

The above-described transmission antenna directivity control apparatus will be described in more detail. A reception array antenna section 101 has the plurality of array antenna elements 101-1 to 101-N to receive CDMA signals. An A/D conversion section 102 has the N A/D converters 102-1 to 102-N to A/D-convert the outputs from the array antenna elements 101-1 to 101-N, respectively.

A reception beam forming section 103 has the M beam formers 103-1 to 103-M to receive the outputs from the A/D conversion section 102 and execute beam forming using multi-beams, thereby forming M beam outputs. The beam power detection section 104 measures the power of each of the beam outputs beam-formed by the beam formers 103-1 to 103-M. The beam output selecting/combining section 105 selects and combines one or more high-level outputs from the beam outputs on the basis of the power information of each beam from the beam power detection section 104.

The transmission weight generation section 106 generates a transmission weight on the basis of the power information of each beam from the beam power detection section 104 such that a transmission beam more accurate than the direction resolving power of reverse link multi-beams can be formed. The transmission beam forming section 107 sends the weighted transmission data to each antenna element, thereby executing beam forming for the transmission data. The D/A conversion section 108 has the N D/A converters 108-1 to 108-N to D/A-convert the outputs from the transmission beam forming section 107.

A transmission array antenna section 109 has the plurality of array antenna elements 109-1 to 109-N to transmit the transmission data from each antenna.

The operation of the transmission weight generation section 106 will be described in more detail. A linear array with six elements is used as the array antenna. For the simplicity, the antenna element interval is assumed to be a half-wavelength interval for both transmission and reception. When the multi-beams shown in FIG. 4 are used, the weight coefficient of each beam is calculated by $$Wn(p)=(1/6) \exp\{j2\pi(1/6)(p-1)(n-1)+j(\pi/6)(n-1)\} \quad (1)$$

where p (p=0 to 5) is the beam number, and n (n=0 to 5) is the antenna weight number.

First, the transmission weight generation section 106 receives the power information of each beam from the beam power detection section 104. Next, a detection section 106-1 detects the beam number p1 and reception power P1 of a beam that exhibits the maximum power, and the beam number p2 and power P2 of one of adjacent beams, that exhibits a larger power. A power ratio calculation section 106-2 calculates the power ratio $R_p$ of the two detected powers P1 and P2 using $$Rp=P1/P2 \quad (2)$$

A direction shift calculation section 106-3 calculates a signal arrival direction shift $\phi$ from the beam center direction on the basis of the obtained power ratio $R_p$ using $$\phi p=f(Rp) \quad (3)$$

The reverse characteristic of this function can easily be calculated from the gain characteristic of the beam. For this reason, the signal arrival direction shift $\phi$ is preferably obtained by looking up a table in a ROM (Read Only Memory) or the like which stores the correlation between the signal arrival direction shift $\phi$ and the power ratio $R_p$ in advance.

A weight coefficient calculation section 106-4 adds a direction correction term serving as a signal arrival direction control term to the weight coefficient used for reverse link reception in accordance with equations (1) and (3) to obtain a weight coefficient to be used for forward link transmission using $$Wn(p1,p2, \phi)=(1/6) \exp \{j2\pi(1/6)(p1-1)(n-1)+j(\pi/6)(n-1)+j(p2-p1)\pi \sin \phi\} \quad (4)$$

FIG. 4 shows six multi-beam patterns in reception. In reverse link reception, when a signal arrives from a direction indicated by an arrow in FIG. 4, the transmission weight generation section 106 for forward link transmission detects p1 as "A" and p2 as "B" from the reception power output from the beam power detection section 104.

In this case, in equation (4), p1 of the first term on the right-hand side represents that "A" is used as a reference beam, (p2-p1) of the third term represents the position of the adjacent beam, i.e., left or right side, with a positive or negative value, and $\pi \sin\phi$ represents the magnitude of beam direction control.

Figure 5A:
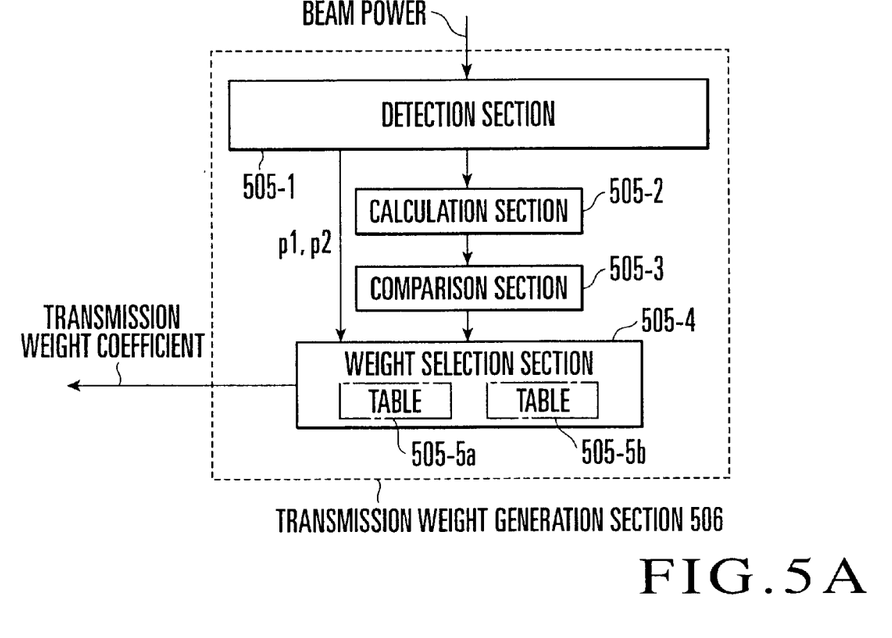
FIG. 5A is a block diagram of a transmission weight generation section according to the second embodiment of the present invention.
Figure 5B:
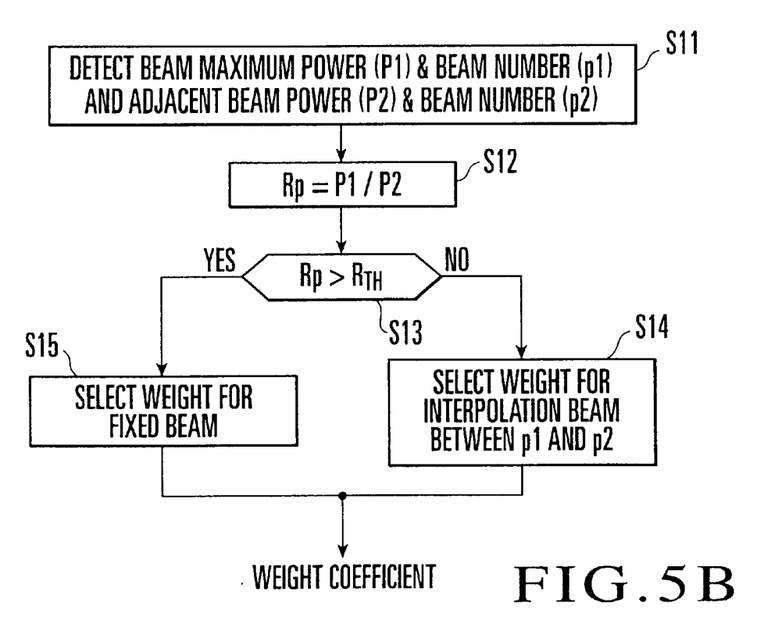
FIG. 5B is a flow chart showing transmission weight generation operation.

FIG. 5A shows a transmission weight generation section according to the second embodiment of the present invention, and FIG. 5B explains transmission weight generation operation.

In the embodiment shown in FIG. 1, the weight coefficient is appropriately calculated from the ratio of reverse link reception powers. However, as shown in FIG. 4, near the beam center, the difference between the reception powers of two adjacent beams becomes large, resulting in difficulty in calculating the signal arrival direction shift $\phi$. This is because it hard to detect weak reception power, or the range of presence of Rp widens, and the table of equation (3) has a larger scale.

Figure 6:
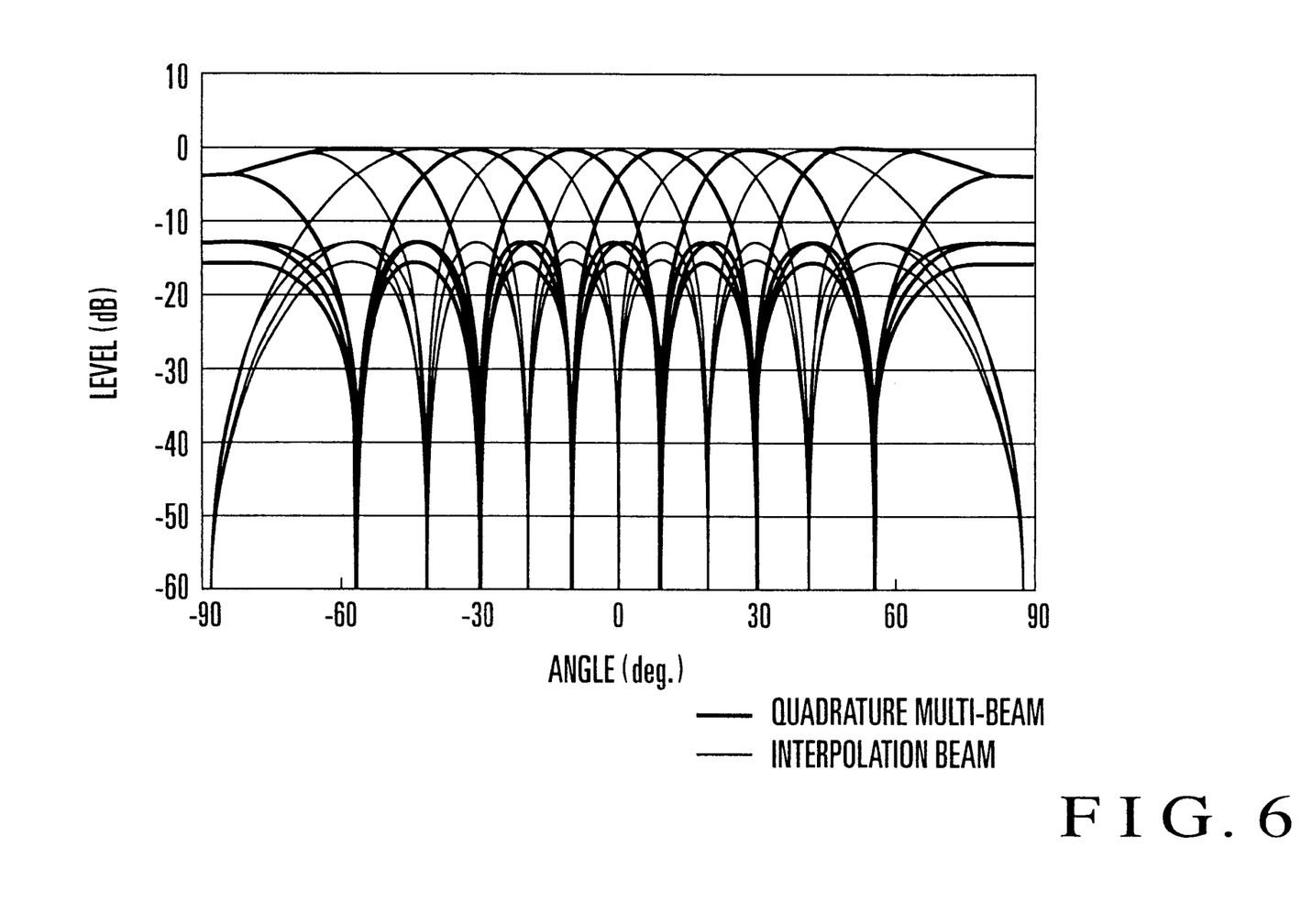
FIG. 6 is a view showing multi-beam patterns including interpolation beams.

As shown in FIG. 6, interpolation beams (thin solid lines) are prepared between the multi-beams shown in FIG. 4, and it is only determined whether the interpolation beam is selected. The operations of a detection section 505-1 and calculation section 505-2 (steps S11 and S12) are the same as those of the detection section 106-1 and power ratio calculation section 106-2 shown in FIG. 1. An appropriate threshold value RTH is prepared for the power ratio $R_p$ obtained by the calculation section 106-2, and a comparison section 505-3 compares the power ratio $R_p$ with the threshold value RTH (step S13).

When the comparison result indicates $R_p \leq$ RTH, a weight selection section 505-4 uses an interpolation beam between beam powers p1 and p2 (step S14). If $R_p >$ RTH, the fixed beam p1 that exhibits the maximum reception power is used (step S15). In this case, the direction resolving power of a transmission beam is doubled. The threshold value can easily be calculated from the gain characteristic of the beam.

As a method of selecting a weight coefficient corresponding to the fixed beam with the beam power p1 by the weight selection section 505-4, weight coefficients corresponding to the fixed beams (transmission beams corresponding to "A" to "F" in FIG. 4) are registered in advance in a table 505-5a formed from a recording medium such as a ROM, and the table 505-5a is looked up.

As a method of selecting an interpolation beam between the beam powers p1 and p2, similarly, weight coefficients corresponding to the interpolation beams are registered in a table 505-5b in advance, and the table 505-5b is looked up.

As has been described above, according to the present invention, a transmission beam having a direction resolving power more accurate than that of multi-beams used in reception can easily be formed.

What is claimed is:

1. A transmission antenna directivity control apparatus for controlling directivity formed by a plurality of transmission array antenna elements for a radio wave signal arrival direction to a plurality of reception array antenna elements, comprising:

reception multi-beam generation means for weighting and combining reception signals from the reception array antenna elements using a preset weight coefficient to generate reception multi-beams;

transmission weight coefficient generation means for generating, in accordance with detection powers of the reception multi-beams from said reception multi-beam generation means, a transmission weight coefficient for transmission data in correspondence with each of transmission multi-beams corresponding to the transmission array antenna elements; and transmission multi-beam generation means for multiplying the transmission data by the transmission weight coefficient from said transmission weight coefficient generation means to generate the transmission multi-beams and supplying the transmission multi-beams to the corresponding transmission array antenna elements, said transmission weight coefficient generation means comprising power ratio calculation means for calculating a power ratio of a maximum power of the detection powers of the reception multi-beams to an adjacent power of the maximum power beam, which exhibits a larger power beam, and transmission weight coefficient calculation means for calculating the transmission weight coefficient on the basis of the power ratio from said power ratio calculation means.

2. An apparatus according to claim 1, wherein said transmission weight coefficient calculation means comprises shift amount detection means for detecting a radio wave arrival direction shift amount from a beam center direction on the basis of the power ratio from said power ratio calculation means, and calculation means for calculating the transmission weight coefficient corrected in accordance with the shift amount from said shift amount detection means.

3. An apparatus according to claim 2, wherein said transmission weight coefficient generation means further comprises beam number detection means for detecting a beam number of the maximum power and a beam number of the adjacent power, and said calculation means calculates the transmission weight coefficient by a function which uses the shift amount from said shift amount detection means as a direction correction term and the beam number from said beam number detection means as a variable.

4. An apparatus according to claim 1, wherein said transmission weight coefficient generation means further comprises first weight coefficient storage means which stores a weight coefficient corresponding to each of the transmission multi-beams in advance, second weight coefficient storage means which stores in advance a weight coefficient corresponding to each of interpolation beams inserted between adjacent beams of the transmission multi-beams, and selection means for selecting one of the weight coefficients stored in said first and second weight coefficient storage means in accordance with a value of the power ratio from said power ratio calculation means.

5. An apparatus according to claim 4, wherein when the power ratio from said power ratio calculation means is larger than a predetermined threshold value, said selection means selects said first weight coefficient storage means and outputs the weight coefficient of the transmission beam corresponding to the maximum power to said transmission multi-beam generation means.

6. An apparatus according to claim 4, wherein when the power ratio from said power ratio calculation means is not more than a predetermined threshold value, said selection means selects said second weight coefficient storage means and outputs the weight coefficient of the interpolation beam between the maximum power and the adjacent power to said transmission multi-beam generation means.

7. A transmission antenna directivity control method of controlling directivity formed by a plurality of transmission array antenna elements for a radio wave signal arrival direction to a plurality of reception array antenna elements, comprising the steps of:

weighting and combining reception signals from the reception array antenna elements using a preset weight coefficient to generate reception multi-beams;

generating, in accordance with detection powers of the generated reception multi-beams, a transmission weight coefficient for transmission data in correspondence with each of transmission multi-beams corresponding to the transmission array antenna elements; and multiplying the transmission data by the generated transmission weight coefficient to generate the transmission multi-beams and supplying the transmission multi-beams to the corresponding transmission array antenna elements, the transmission weight coefficient generation step comprising the steps of calculating a power ratio of a maximum power of the detection powers of the reception multi-beams to an adjacent power of the maximum power beam, which exhibits a larger power beam, and calculating the transmission weight coefficient on the basis of the calculated power ratio.

8. A method according to claim 7, wherein the transmission weight coefficient generation step comprises the steps of detecting a radio wave arrival direction shift amount from a beam center direction on the basis of the calculated power ratio, and calculating the transmission weight coefficient corrected in accordance with the detected shift amount.

9. A method according to claim 8, wherein the transmission weight coefficient generation step further comprises the step of detecting a beam number of the maximum power and a beam number of the adjacent power, and the calculation step comprises the step of calculating the transmission weight coefficient by a function which uses the detected shift amount as a direction correction term and the detected beam number as a variable.

10. A method according to claim 7, wherein the transmission weight coefficient generation step further comprises the step of, in accordance with a value of the calculated power ratio, selecting one of a first table which stores a weight coefficient corresponding to each of the transmission multi-beams in advance and a second table which stores in advance a weight coefficient corresponding to each of interpolation beams inserted between adjacent beams of the transmission multi-beams.

11. A method according to claim 10, wherein the selection step comprises the step of, when the calculated power ratio is larger than a predetermined threshold value, selecting the first table and outputting the weight coefficient of the transmission beam corresponding to the maximum power.

12. A method according to claim 10, wherein the selection step comprises the step of, when the calculated power ratio is not more than a predetermined threshold value, selecting the second table and outputting the weight coefficient of the interpolation beam between the maximum power and the adjacent power.

* * * * *